United States Patent
Blum et al.

(10) Patent No.: US 7,018,040 B2
(45) Date of Patent: *Mar. 28, 2006

(54) STABILIZED ELECTRO-ACTIVE CONTACT LENS

(75) Inventors: Ronald D. Blum, Roanoke, VA (US); William Kokonaski, Gig Harbor, WA (US)

(73) Assignee: E-Vision, LLC, Roanoke, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/996,781

(22) Filed: Nov. 24, 2004

(65) Prior Publication Data

US 2005/0099594 A1  May 12, 2005

Related U.S. Application Data

(63) Continuation of application No. 10/637,210, filed on Aug. 8, 2003, now Pat. No. 6,851,805, and a continuation-in-part of application No. 10/422,128, filed on Apr. 24, 2003, now Pat. No. 6,857,741, said application No. 10/422,128 and a continuation-in-part of application No. 10/387,143, filed on Mar. 12, 2003, said application No. 10/387,143 and a continuation-in-part of application No. 10/281,204, filed on Oct. 28, 2002, now Pat. No. 6,733,130, and a continuation-in-part of application No. 10/046,244, filed on Jan. 16, 2002, now Pat. No. 6,871,951, said application No. 10/046,244 and a continuation-in-part of application No. 09/602,013, filed on Jun. 23, 2000, now Pat. No. 6,619,799.

(60) Provisional application No. 60/403,096, filed on Aug. 13, 2002, provisional application No. 60/402,357, filed on Aug. 9, 2002, provisional application No. 60/401,700, filed on Aug. 7, 2002, provisional application No. 60/375,028, filed on Apr. 25, 2002, provisional application No. 60/363,549, filed on Mar. 13, 2002, provisional application No. 60/331,419, filed on Nov. 15, 2001, provisional application No. 60/326,991, filed on Oct. 5, 2001, provisional application No. 60/261,805, filed on Jan. 17, 2001, provisional application No. 60/161,363, filed on Oct. 26, 1999, provisional application No. 60/150,564, filed on Aug. 25, 1999, provisional application No. 60/150,545, filed on Aug. 25, 1999, provisional application No. 60/147,813, filed on Aug. 10, 1999, provisional application No. 60/143,626, filed on Jul. 14, 1999, provisional application No. 60/142,053, filed on Jul. 2, 1999.

(51) Int. Cl.
*G02C 7/04* (2006.01)

(52) U.S. Cl. .............................. 351/160 R; 351/160 H; 351/174

(58) Field of Classification Search ................ 351/159, 351/160 H, 160 R, 166, 174
See application file for complete search history.

(56) References Cited

U.S. PATENT DOCUMENTS 3,973,837 A * 8/1976 Page ...................... 351/160 R

*Primary Examiner*—Scott J. Sugarman
*Assistant Examiner*—Darryl J. Collins
(74) *Attorney, Agent, or Firm*—Hunton & Williams LLP

(57) ABSTRACT

An electro-active contact lens system and a method for making the electro-active contact lens system is disclosed. The system includes a contact lens, an electro-active element attached to the contact lens, a view detector attached to the contact lens and in electronic communication with the electro-active element, and a power source attached to the contact lens. In certain embodiments, the view detector may be a rangefinder which determines the distance of an object being viewed and these embodiments further include a means to stabilize the rangefinder between the opening of the eyelids when the electro-active contact lens system is worn by a wearer. The electro-active contact lens system provides electro-active vision correction of one or more focal lengths.

21 Claims, 4 Drawing Sheets

U.S. PATENT DOCUMENTS

| | | | |
|---|---|---|---|
| 4,813,777 A * | 3/1989 | Rainville et al. | 351/161 |
| 5,359,444 A * | 10/1994 | Piosenka et al. | 349/13 |
| 5,712,721 A * | 1/1998 | Large | 359/245 |
| 6,115,177 A * | 9/2000 | Vossler | 359/465 |
| 6,491,394 B1 * | 12/2002 | Blum et al. | 351/228 |
| 6,851,805 B1 * | 2/2005 | Blum et al. | 351/160 R |

* cited by examiner

STABILIZED ELECTRO-ACTIVE CONTACT LENS

RELATED APPLICATIONS

This application is a continuation of U.S. patent application Ser. No. 10/637,210, filed Aug. 8, 2003 now U.S. Pat. No. 6,851,805. U.S. patent application Ser. No. 10/637,210 claims the benefit of U.S. Provisional Application Nos. 60/402,357, filed Aug. 9, 2002, and 60/403,096 filed Aug. 13, 2002. U.S. patent application Ser. No. 10/637,210 is also a continuation-in-part of Ser. No. 10/281,204, now U.S. Pat. No. 6,733,130 filed Oct. 28, 2002, Ser. No. 10/422,128, filed Apr. 24, 2003 now U.S. Pat. No. 6,857,741, Ser. No. 10/387,143, filed Mar. 12, 2003, and Ser. No. 10/046,244, filed Jan. 16, 2002 now U.S. Pat. No. 6,871,951. U.S. Pat. No. 6,733,130 is a continuation of U.S. Pat. No. 6,491,394, filed Jun. 23, 2000. U.S. patent application Ser. No. 10/422,128 claims the benefit of U.S. Provisional Application No. 60/375,028, filed Apr. 25, 2002, and is a continuation-in-part of U.S. patent application Ser. No. 10/387,143, filed Mar. 12, 2003, which claims the benefit of U.S. Provisional Application Nos. 60/363,549, filed Mar. 13, 2002 and 60/401,700, filed Aug. 7, 2002, and is a continuation-in-part of Ser, No. 10/281,204, now U.S. Pat. No. 6,733,130, filed Oct. 28, 2002 and Ser. No. 10/046,244, filed Jan. 16, 2002 now U.S. Pat. No. 6,871,951. U.S. patent application Ser. No. 10/046,244 claims the benefit of U.S. Provisional Application Nos. 60/261,805, filed Jan. 17, 2001, 60/331,419, filed Nov. 15, 2001, and 60/326,991, filed Oct. 5, 2001, and is a continuation-in-part of Ser. No. 09/603,736, now U.S. Pat. No. 6,491,391, filed Jun. 23, 2000, Ser. No. 09/602,014, now U.S. Pat. No. 6,491,394, filed Jun. 23, 2000, and Ser. No. 09/602,012, now U.S. Pat. No. 6,517,203, filed Jun. 23, 2000, and Ser. No. 09/602,013, now U.S. Pat. No. 6,619,799, filed Jun. 23, 2000, all of which claim priority to U.S. Provisional Application Nos. 60/142,053, filed Jul. 2, 1999, 60/143,626, filed Jul. 14, 1999, 60/147,813, filed Aug. 10, 1999, 60/150,545, filed Aug. 25, 1999, 60/150,564, filed Aug. 25, 1999, and 60/161,363, filed Oct. 26, 1999. All of the foregoing applications, provisional applications, and patents referenced in this section are herein incorporated by reference in their entirety.

FIELD OF THE INVENTION

The present invention relates to the field of optics. More particularly, the present invention relates to vision correction with an electro-active contact lens system.

SUMMARY OF THE INVENTION

An electro-active contact lens system is disclosed. The electro-active contact lens system comprises a contact lens, an electro-active element attached to the contact lens, a view detector attached to the contact lens in electronic communication with the electro-active element, and a power source attached to the contact lens to provide power to the electro-active element and the view detector. In some embodiments, the electro-active contact lens system further comprises a means for stabilizing the view detector between a palpebral fissure of an eye of a wearer of the contact lens system.

A method for making an electro-active contact lens system is also disclosed. The method comprises encapsulating an electro-active element and attaching the encapsulated electro-active element and a power source to a contact lens.

Aspects of the present invention will now be described in more detail with reference to exemplary embodiments thereof as shown in the appended drawings.

DETAILED DESCRIPTION OF EXEMPLARY EMBODIMENTS

Figure 1:
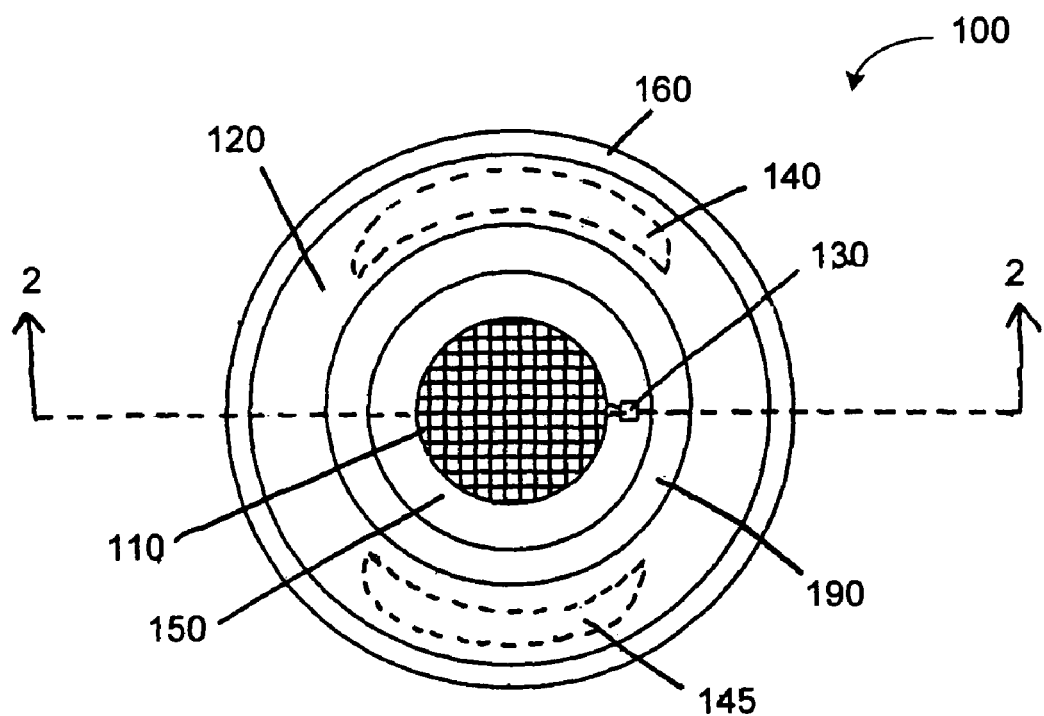
FIG. 1 is an electro-active contact lens system according to an exemplary embodiment of the invention.

In accordance with some embodiments of the invention, an electro-active contact lens system is disclosed. The contact lens system comprises a contact lens, an electro-active element attached to the contact lens, a view detector attached to the contact lens and in electronic communication with the electro-active element, and a power source attached to the contact lens to provide power to the electro-active element and the view detector. The electro-active element provides at least one focal length for vision correction.

The electro-active element may comprise one or more layers of electro-active material, such as a polymer gel and/or liquid crystals which, when activated by an applied electrical voltage, produce an index of refraction which is variable with the amount of the electrical voltage applied to the electro-active material. When a wearer looks through the area of the contact lens system containing the electro-active element, the index of refraction provides electro-active vision correction for the wearer. The contact lens system may provide a vision correction area which includes an area for fixed distance vision correction in addition to the area for electro-active vision correction.

In certain embodiments, each of the one or more electro-active layers of the electro-active element may comprise a grid array having a plurality of pixilated grid elements, with each grid element capable of independent activation. Each grid element may be connected to a plurality of substantially transparent electrodes and separated from adjacent grid elements by a substantially transparent insulating material such as silicon dioxide.

By varying the voltage applied to the electro-active material in different grid elements of the array, minor adjustments can be made in the electro-active element to correct ocular aberrations and/or other higher order or non-conventional refractive errors, such as coma and spherical aberrations, for example, and may also correct other aberrations, such as chromatic aberrations for example. This correction of non-conventional refractive error is in addition to correction of conventional refractive error such as myopia, hyperopia, presbyopia, and astigmatism, for example, which may also be provided by the electro-active layers of the electro-active element.

In embodiments where the one or more electro-active layers comprise a grid array of pixilated grid elements, the electro-active layer may further comprise a metallic layer, an alignment layer, a conducting layer, and/or an insulating layer. The metallic layer may be etched to comprise an array of electrodes separated by a layer of insulating material on the metallic layer. The electro-active material be attached to one side of the metallic layer having the array of electrodes. On the other side of the metallic layer, a conductive layer, which may comprise an optically transparent conducting material such as indium tin oxide, may be attached to the metallic layer. The conductive layer may then be attached to a power source to direct an applied voltage to the plurality of electrodes in the metallic layer.

Suitable electro-active materials include various classes of liquid crystals and polymer gels. These classes include nematic, smectic, and cholesteric liquid crystals, polymer liquid crystals, polymer dispersed liquid crystals, and polymer stabilized liquid crystals as well as electro-optic polymers.

If liquid crystals such as nematic liquid crystals are used as the electro-active material, an alignment layer may be required because nematic and many other liquid crystals, are birefringent. That is, they display two different focal lengths when exposed to unpolarized light absent an applied voltage. This birefringence gives rise to double or fuzzy images on the retina. To alleviate this birefringence, a second layer of electro-active material may be used, aligned orthogonal to the first layer of electro-active material. In this manner, both polarizations of light are focused equally by both of the layers, and all light is focused at the same focal length.

Alternatively, the use of cholesteric liquid crystals, which have a large chiral component may be used instead as a preferred electro-active material. Unlike nematic and other common liquid crystals, cholesteric liquid crystals do not have the polarity of nematic liquid crystals, avoiding the need for multiple layers of electro-active material in a single electro-active layer.

Various electro-active layers which may be used in the electro-active element of embodiments of the present invention are described in the aforementioned applications which have previously been incorporated by reference in their entirety.

The contact lens system may be multi-focal to provide vision correction for more than one focal length. In certain embodiments of the invention, vision correction for distance vision is provided by a fixed optic. Focal lengths for vision correction other than distance vision, such as for near or intermediate vision, for example, are provided electro-actively. Additionally, even in embodiments in which distance vision is provided by a fixed optic, the contact lens system may provide electro-active correction of non-conventional refractive errors in the wearer's distance vision. This correction may provide the wearer with better than 20/20 vision.

Where multiple focal lengths are desired, a view detector may be used to automatically determine where the wearer is looking and accordingly how the electro-active element should be activated in order to provide the proper focal length or focal lengths based on the gaze of the wearer. The view detector is a device which detects that a change in focal length is needed by the wearer and adjusts the voltage applied to the electro-active element to switch focal lengths depending on the proper vision correction required by the wearer of the contact lens system. The view detector may be a rangefinder or an eye tracker such as a micro-gyroscope or tilt switch for example, or the view detector may be a combination of one or more of these devices.

If the view detector is a rangefinder, the rangefinder may utilize various sources such as lasers, light emitting diodes, radio-frequency waves, microwaves, or ultrasonic impulses to locate an object being viewed and determine the object's distance from the wearer based on the time for a transmission from the rangefinder to be reflected by the object being viewed and received by the rangefinder. The rangefinder may comprise a transmitter and detector coupled to a controller. In another embodiment, a single device can be fabricated to act in dual mode as both a transmitter and detector connected to the controller.

The controller may be a processor, microprocessor, integrated circuit, or chip that contains at least one memory component. The controller stores information such as a vision prescription that may include the wearer's prescription for several different focal lengths. The controller may be a component of, or integral with, the rangefinder. In certain embodiments, the transmitter of the rangefinder is an organic light emitting diode (OLED), which may be translucent or transparent, causing minimal interference with the wearer's vision.

The rangefinder is in electronic communication with the electro-active element, either directly or via the controller. When the rangefinder detects that the focal length produced by the electro-active element should be switched to provide a different focal length, the rangefinder may electronically signal the controller. In response to this signal, the controller adjusts the voltage applied to the electro-active element to produce a new index of refraction consistent with a vision prescription stored in the memory of the controller. The new index of refraction produces an appropriate optical power in the contact lens system to correspond to the change in focal length.

In another exemplary embodiment, the view detector may be a tiny micro-gyroscope or micro-accelerometer in the contact lens system. A small, rapid shake or twist of the eyes or head may trigger the micro-gyroscope or micro-accelerometer and cause a switch to rotate through pre-determined position settings, changing the focus of the electro-active element to the desired correction. For example, upon detection of movement by either the micro-gyroscope or micro-accelerometer used in combination with a rangefinder, the controller may be programmed to provide power to the rangefinder so that an observed field may be interrogated by the rangefinder to determine if a change in vision correction is required. Similarly, following a predetermined interval, or period of time in which no eye movement is detected, the rangefinder may be turned off.

In another exemplary embodiment, another view detector, such as a tilt switch, may be employed to determine whether the wearer's eyes are tilted down, or up, at a given angle above or below a posture that would be indicative of someone looking straight ahead in the distance. For example, an illustrative tilt switch may include a mercury switch mounted in the controller that closes a circuit that provides power to the rangefinder, and/or the controller, only when the wearer is looking up or down a predetermined angle away from a horizontal. Additionally, the contact lens system may employ an additional requirement that an object be sensed in the near or intermediate distance for some predetermined period of time before switching occurs.

It should be appreciated that the micro-gyroscope and/or the tilt switch may be used as a view detector independent of a rangefinder. For example, the micro-gyroscope may detect rotation of the wearer's eye rotating downward and inward with respect to the wearer. This eye position is indicative of an eye engaged in reading and accordingly, the micro-gyroscope may change the focus of the electro-active element to near vision.

Movement and/or rotation of any contact lens occurs during normal use, such as when the wearer blinks his/her eyes. This movement and/or rotation may be intensified by the weight of the view detector in the electro-active contact lens system. Accordingly, the contact lens system may be stabilized to maintain the position of the view detector at a constant location which resists movement. In embodiments in which the view detector is a rangefinder, the rangefinder is stabilized between the palpebral fissure of the eyelids and to prevent movement and/or rotation of the contact lens system. The palpebral fissure, or opening, of the eyelids is the portion of the eye that is exposed more than any other between blinks. Maintaining the rangefinder between the palpebral fissure permits the most uninterrupted flow of light to the rangefinder. Concealment of the rangefinder, such as if the rangefinder were to rotate behind the eyelids, may result in transmissions by the rangefinder reflecting off of the eyelid and not the object being viewed. This may prevent the rangefinder from properly determining object distances for correct focal length activation and prevent proper functioning of the contact lens system.

In embodiments where the view detector includes a micro-gyroscope or tilt switch, rotation of the lens may vary the orientation of the view detector. In this case, the micro-gyroscope or tilt switch may rotate on the eye such that when the wearer looks up, the device may be oriented to erroneously detect that the wearer is looking down, activating an improper focal length.

In one embodiment of the invention, as shown in FIG. 1, electro-active contact lens system 100 has an electro-active element 110 attached to a contact lens 120. The contact lens 120 may optionally have a comfort taper 160 adjacent the outer perimeter of the contact lens 120. The comfort taper may be created by thinning a peripheral edge at the outer perimeter of the contact lens 120. The comfort taper 160 may reduce sensitivity of the eye or eyelid to the electro-active contact lens system 100 when worn.

A rangefinder 130, which as described may be integral with a controller, is positioned at or near a horizontal meridian of the contact lens system 100 so the rangefinder 130 is between the palpebral fissure of the eyelid when the contact lens system 100 is worn, with the rangefinder 130 typically within about plus or minus forty-five degrees of the horizontal meridian. Preferably, the rangefinder 130 is within about plus or minus fifteen degrees of the horizontal meridian and most preferably is within about plus or minus ten degrees of the horizontal meridian. The rangefinder 130 may be placed at any radial distance from the center of the contact lens system 100. In certain embodiments, the rangefinder 130 is placed outside of the vision correction area of the contact lens system 100 to interfere as little as possible with the wearer's vision.

Once the rangefinder 130 is placed at a desired location either on the surface or in the bulk of the contact lens 120, the contact lens system 100 may be stabilized to prevent movement and/or rotation of the contact lens system 100 and to maintain the rangefinder 130 between the palpebral fissure of the eyelids when the contact lens system 100 is worn. The contact lens system 100 may be stabilized through the placement of a plurality of stabilizing pieces 140, 145 on or in the contact lens 120. In certain exemplary embodiments, these stabilizing pieces 140, 145 may be prism weights, slab-offs, or a combination of the two. The stabilizing pieces 140, 145 maintain the orientation of the contact lens system 100 when the contact lens system 100 is worn on the eye, substantially preventing the contact lens system 100 from rotating, which may cause the rangefinder 130 to rotate to a concealed location behind the eyelid.

Prism weights typically increase in thickness as the radial distance from the center of the contact lens increases. The thicker portions of the prism weight contact the lower eyelid and stabilize lens rotation by creating a concentration of increased mass at the base of the contact lens 120. Alternatively, slab-off techniques involve modifying both the superior and inferior surfaces of the contact lens with a decreased thickness as the radial distance from the center of the contact lens increases such that the upper and lower eyelids squeeze the contact lens towards the eye's surface in opposite directions.

It should be appreciated that the stabilizing pieces 140, 145 may be of any shape and size adapted to stabilize the contact lens system 100 without substantially interfering with the vision of the wearer. For example, although each of the stabilizing pieces 140, 145 shown in FIG. 1, are shown as single, crescent shaped pieces, the contact lens system 100 may be stabilized by a series of several smaller stabilizing pieces arranged to produce a similar stabilization effect. In this way, it should further be appreciated that any number of combinations using one or more stabilizing pieces to stabilize the contact lens system 100 may be incorporated in various embodiments of the invention.

As shown in FIG. 1, the contact lens system 100 includes a fixed distance optical region 150 for the correction of distance vision. The distance vision correction provided by viewing through an area of the contact lens system 100 in the fixed distance optical region 150 is in addition to electro-active vision correction provided by the electro-active element 110 for focal lengths other than distance vision. Together, these areas make up the total vision correction area provided by the contact lens system 100. In the event that the electro-active element 110 were to fail for any reason, for example if a loss of power caused the applied voltage to stop flowing through the electro-active element, the fixed distance optical region 150 allows the wearer to continue to have vision correction for distance vision. Maintaining distance vision is important because loss of all vision correction could have dangerous consequences such as, for example, if the electro-active element 110 were to fail while the wearer was driving.

The contact lens 120 may comprise either one or both of an optic portion and a non-optic portion. If the contact lens 120 contains an optic portion, the optic portion includes the fixed distance optical region 150 of the contact lens system 100. The non-optic portion of the contact lens 120 provides mechanical support for the contact lens system 100, and may include one or more stabilizing pieces 140, 145. It should be appreciated, however, that in certain embodiments the entire contact lens 120 may have a fixed optic power, although in these embodiments, vision correction may not be provided outside of the area of the contact lens 120 which covers the pupil.

The contact lens 120 is substantially circular from a frontal view as shown in FIG. 1 and has a concave side suitable for matching the curvature of an eye. Size of the contact lens 120 may vary depending on certain physical attributes of the wearer to be fitted with the contact lens system 100, such as the age of the wearer or the size or curvature of the wearer's eye, for example. Typically, the total vision correction area of the contact lens system 100 is substantially circular and is about 4 mm to about 10 mm, preferably about 5 mm to about 8 mm, in diameter.

Electrical power may be provided to the electro-active element 110, as well as the rangefinder 130 and controller by affixing a conformal power source 190, such as a battery, capacitor, or other power storage device, for example, to the contact lens system 100. The conformal power source 190 is a thin film formed to the shape of the contact lens 120. The power source 190 may be ring shaped and affixed to the contact lens 120 outside of the vision correction area, which may spread the weight of the power source evenly across the contact lens 120, without interfering with the wearer's vision. It should be appreciated that in some embodiments, the power source 190 may not be ring shaped, but instead may be affixed to the contact lens 120 as a stabilizing piece 145. In these embodiments, the weight of the power source 190 may act as a counterbalance to further stabilize the contact lens system 100 and maintain the rangefinder 130 between the palpebral fissure.

The power source 190 may provide electrical power which has been previously stored such as in a battery. Alternatively, the power source 190 may convert kinetic energy from movement of the eye into electric energy using electromechanical conversion techniques employing, by way of example only, thin films of transparent piezoelectric polymers. The power source 190 could also be produced by the conversion of light into electricity using a thin photovoltaic cell produced from, by way of example only, transparent photovoltaic polymeric films.

The electro-active element 110 provides electro-active vision correction for at least one focal length. This may include electro-active near and/or intermediate vision, which are the most common focal lengths required by a wearer needing vision correction for multiple focal lengths. Further, intermediate vision may be either or both of near intermediate vision and far intermediate vision. In these embodiments, distance vision is provided by the contact lens 120, with the exception of the use of adaptive optics to electro-actively correct non-conventional refractive error in the wearer's distance vision by activating only certain portions of the electro-active element. Eliminating non-conventional refractive error may correct the wearer's vision to better than 20/20, up to and including correcting the wearer's vision to better than 20/10.

The area of the contact lens system 100 for vision correction provided by the electro-active element 110 may be as large as or smaller than the vision correction area provided by the fixed distance optical region 150. In at least one embodiment in which the area of the electro-active element 110 is smaller than the fixed distance optical region 150, the electro-active element 110 covers at least a portion of the pupil, and is preferably centered over the pupil.

Figure 2:
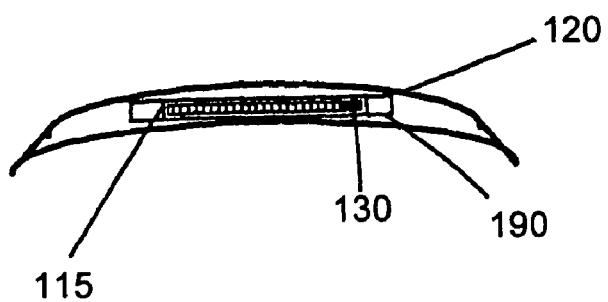
FIG. 2 is a cross-sectional view of the electro-active contact lens system of FIG. 1.

In certain embodiments of the invention, the electro-active element 110 is encapsulated prior to attaching it to the contact lens 120. An example of an encapsulated element 110 is shown in FIG. 2 as a cross-sectional view of the contact lens system 100 shown in FIG. 1. A capsule 115 contains the electro-active element 110. The contact lens 120 may be molded around the capsule 115, such that the capsule 115 is disposed within the bulk of the contact lens 120. The capsule 115 is substantially circular and is adapted to receive the electro-active element 110. The capsule 115 is optically transparent to light and allows a wearer to view through the capsule 115.

The capsule 115 is preferably rigid and may be constructed either from non-gas permeable, hydrophobic materials or gas-permeable materials. One example of a suitable non-gas permeable, hydrophobic material includes polymethylmethacrylate (PMMA).

Suitable rigid gas permeable materials include methylmethacrylate (MMA) copolymerized with silicone acrylate, or MMA copolymerized with methacryloxypropyl tris(trimethoxysilane) (TRIS), for example. MMA-TRIS doped with fluoromethacrlyates is a particularly suitable gas permeable material for the capsule 115.

The contact lens 120 may be constructed from rigid gas permeable material or a flexible hydrophilic material. Examples of suitable flexible hydrophilic materials include, for example, thermo-set polymer hydrogels such as hydroxyethyl methacrylate (HEMA), HEMA cross-linked with either ethylene dimethacrylate (EDMA) or ethylene glycol monogethacrylate (EGDMA), or silicone based polymers such as polydimethylsiloxane (PDMS).

Optical grade hydrophilic, gas permeable and non-gas permeable materials in addition to those described are well known in the contact lens art. Generally, any of these materials may be used in any combination for construction of the capsule 115 or the contact lens 120. However, a rigid, hydrophobic and/or waterproof capsule in combination with either a rigid gas permeable contact lens or a flexible hydrophilic contact lens is preferred.

In some embodiments, the rangefinder 130, as well as the controller and the power source, may be sealed in the capsule 115 along with the electro-active element 110, such that all electronic components of the contact lens system 100 are contained in the capsule 115. This may have the advantage of decreasing the cost of manufacture as the electronic components can be manufactured and encapsulated separately. Additionally, the capsule 115 may be constructed of a hydrophobic or water proof material, or sealed with a water proof sealant, which may provide the advantage of protecting the electronic components from being affected by tears or other secretions of the eye. If constructed separately, the capsule 115 may later be attached to the contact lens 120 to create the contact lens system 100 without the need to separately attach the rangefinder 130 to the contact lens 120. It should be appreciated, however, that placement of the rangefinder 130 in the capsule 115 is not required and it may be placed anywhere on or in the contact lens 120 outside of the capsule 115. In this case, the rangefinder 130 is connected to the electro-active element 110 via conductors which pass out of the capsule 115 into the contact lens 120 to the rangefinder 130.

Figure 3:
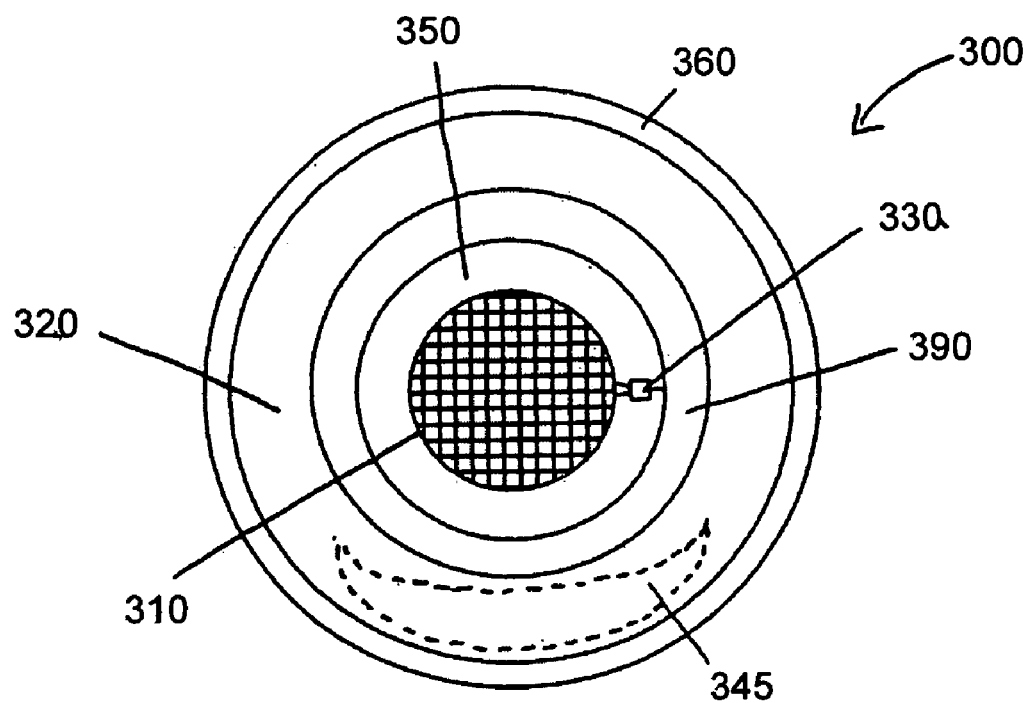
FIG. 3 is an electro-active contact lens system according to another exemplary embodiment of the invention.

In some embodiments, as shown in FIG. 3, it may be desirable to use only a single stabilizing piece 345, such as a single slab-off or prism weight, for example, to stabilize the contact lens system 300. At least a portion of the single stabilizing piece 345 is typically attached below the horizontal meridian of the contact lens 320. As shown in FIG. 3, the area of the contact lens system 300 potentially obscured by including additional stabilizing pieces is decreased. As a result, a larger area of the contact lens system 300 may be used to provide optical power for vision correction. Availability of additional lens area to provide vision correction may be particularly advantageous in applications such as night vision or other low light settings, for example. In decreased light, pupil dilation may expand the pupil outside of a small vision correction area of a contact lens system 300, creating the possibility of blurred or distorted vision.

Figure 4A:
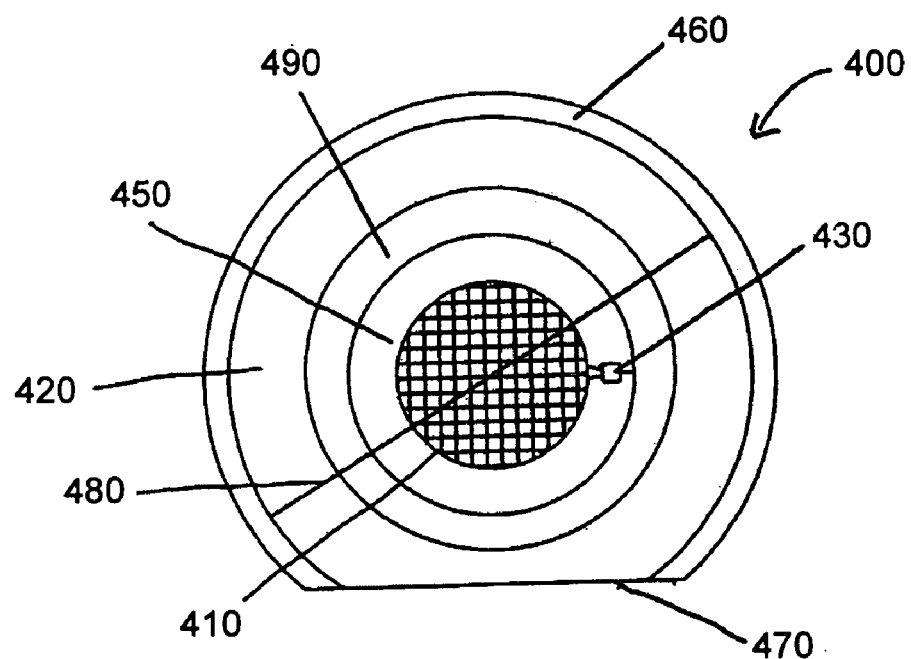
FIG. 4a is an electro-active contact lens system according to an exemplary embodiment of the invention.

In still another exemplary embodiment, as shown in FIG. 4a, the contact lens system 400 is stabilized in an alternative manner without the use of stabilizing pieces attached to the contact lens 420. Instead, the contact lens system 400 is stabilized by a truncated contact lens 420. The contact lens 420 is truncated along a chord 470 which is below and substantially parallel, within about 5 degrees, to the horizontal meridian of the contact lens 420. Typically, the chord 470 along which the contact lens 420 is truncated is outside of the capsule containing the electro-active element 410. Preferably, the chord 470 along which the contact lens 420 is truncated does not touch any portion of the contact lens system 400 which covers the pupil when the contact lens system 400 is worn and which provides vision correction to the wearer. Typically, about five to about fifteen percent of the contact lens 420 may be truncated to stabilize the contact lens system 400, although more or less of the contact lens 420 may be truncated based on the particular vision needs of the wearer.

Figure 4B:
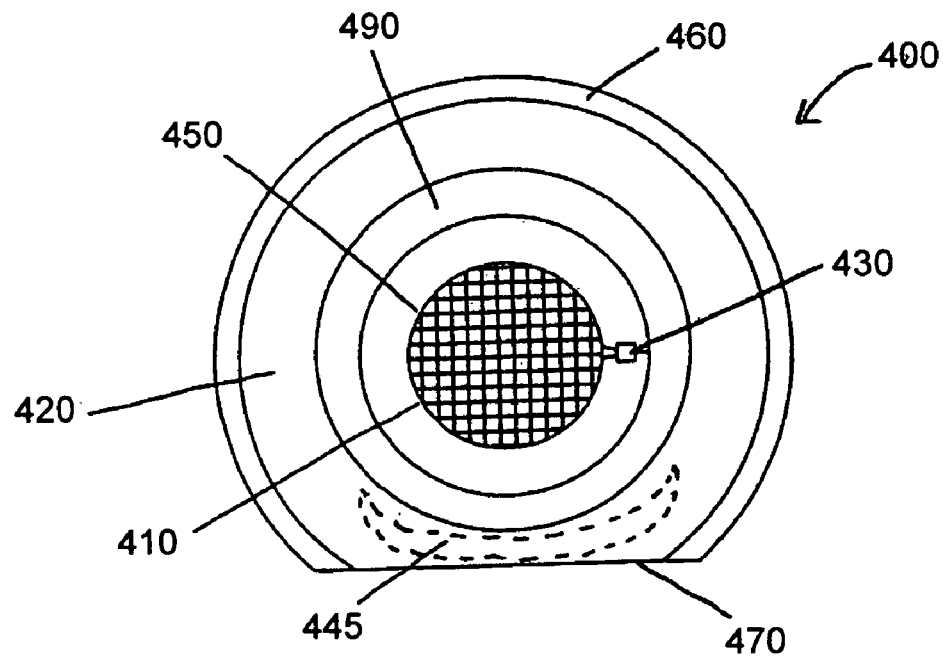
FIG. 4b is another electro-active contact lens system according to an exemplary embodiment of the invention.

Truncation of the contact lens 420 may be sufficient by itself to stabilize the contact lens system 400 and maintain the rangefinder 430 between the palpebral fissure of the eyelids when the contact lens system 400 is worn. Alternatively, one or more stabilizing pieces 445, such as slab-offs or prism weights, may be used in combination with the truncated contact lens 420, as shown in FIG. 4b, to further stabilize the contact lens system 400. In this embodiment, the truncation is preferably minimal such that a slab-off or prism weight may be attached to the contact lens 420 without overlapping the area of the contact lens system 400 which provides vision correction.

In certain embodiments, such as when vision correction for a wearer of an electro-active contact lens system additionally requires correction of astigmatism, the contact lens system may also include a toric power as further illustrated in FIG. 4a. In these embodiments the contact lens system 400 is stabilized to maintain the orientation of the toric axis 480 of the contact lens 420 as well as maintaining the location of the rangefinder 430. Preferably, the toric axis 480 is set prior to placing the rangefinder 430 on the contact lens 420, such as during the initial manufacture of the contact lens 420. Alternatively, the rangefinder 430 may be placed on the contact lens 420 and stabilized first, followed by orienting the toric axis 480 relative to the orientation of the rangefinder 430.

Figure 5:
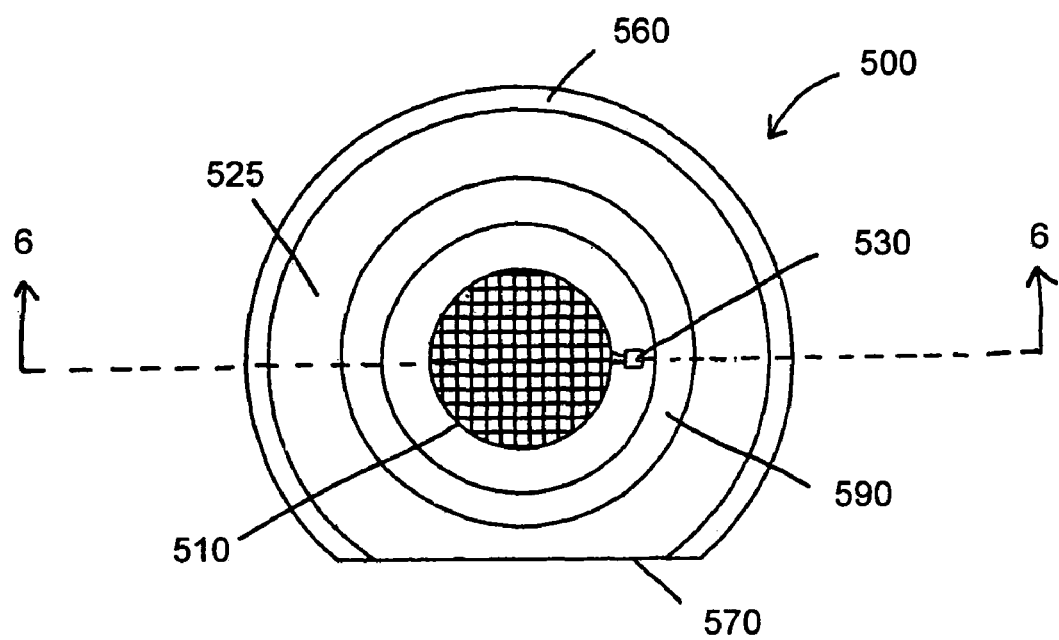
FIG. 5 is an electro-active contact lens system according to an exemplary embodiment of the invention.
Figure 6:
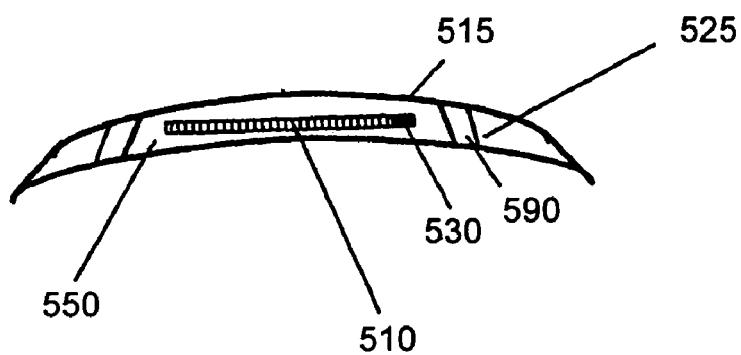
FIG. 6 is a cross-sectional view of the electro-active contact lens system of FIG. 5.

In certain embodiments, the contact lens produces little or no optic power and the distance vision correction provided by the fixed distance optical region of the contact lens system may be provided instead by the capsule containing the electro-active element. The capsule may be manufactured and surfaced to provide an optical power for distance vision correction directly. As shown in FIG. 5, the contact lens is a skirt 525 constructed of hydrophilic material, forming a ring around the capsule 550, which may help tear flow and decrease eyelid sensitivity to the capsule 550. The contact lens skirt 525 is attached to the capsule 550 only at the capsule's outer perimeter 527.

The capsule 550 has a radius of curvature which is surfaced to create an index of refraction that matches a prescription of the wearer for distance vision correction. The embodiment shown in FIG. 5 has a capsule 550 which is not disposed in the bulk of the contact lens, but rather is surrounded by a contact lens skirt 525. The contact lens system 500 may be stabilized by slab-offs, prism weights, and/or truncation in the same manner as described elsewhere.

In still other embodiments, the fixed distance optical power of the contact lens system may be provided by a combination of the contact lens and the capsule. For example, the capsule may be surfaced to have an index of refraction and placed in the bulk of a contact lens also having an index refraction. Together, the indices of refraction may be additive to provide a fixed distance optical power to correct the distance vision of the wearer.

It should be appreciated that in addition to prism weights, slab-offs and truncation, all of which have been discussed in the exemplary embodiments herein, various other methods may be used in stabilizing multi-focal and toric contact lenses. Accordingly, these methods when applied to the embodiments described herein are considered within the scope of the present invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

We claim:

1. An electro-active contact lens system that includes a contact lens, an electro-active element, a view detector stabilized at a predetermined orientation relative to a wearer's eye, and a power source attached to the contact lens to provide power to the electro-active element and the view detector, wherein the power source is a conformal battery.

2. The electro-active contact lens system of claim 1 wherein the view detector comprises a rangefinder.

3. The electro-active contact lens system of claim 1 wherein the view detector comprises a tilt switch.

4. The electro-active contact lens system of claim 1 wherein the view detector comprises a micro-gyroscope.

5. The contact lens system of claim 1 wherein the electro-active element is contained within a capsule connected to the contact lens.

6. The contact lens system of claim 5 wherein the capsule is constructed of a rigid material.

7. The contact lens system of claim 6 wherein the capsule provides a fixed distance optical power.

8. The contact lens system of claim 5 wherein the view detector is contained in the capsule.

9. The contact lens system of claim 1 wherein the contact lens provides a fixed distance optical power.

10. The contact lens system of claim 1 further comprising a truncated portion of the contact lens adapted to stabilize the view detector.

11. An electro-active contact lens system that includes a contact lens, an electro-active element, a view detector stabilized at a predetermined orientation relative to a wearer's eye, and a power source attached to the contact lens to provide power to the electro-active element and the view detector, wherein the power source is adapted to convert kinetic energy from movement of a patient's eye into electric energy.

12. An electro-active contact lens system that includes a contact lens, an electro-active element, a view detector stabilized at a predetermined orientation relative to a wearer's eye, and at least one prism adapted to stabilize the view detector.

13. An electro-active contact lens that includes an electro-active element encapsulated within a rigid material, wherein the rigid material is surrounded by a hydrophilic material.

14. The electro-active contact lens of claim 13 wherein the hydrophilic material encapsulates the rigid material.

15. The electro-active contact lens of claim 13 wherein the hydrophilic material comprises a flange around a periphery of the rigid material.

16. An electro-active contact lens system that includes a contact lens, an electro-active element, and a view detector stabilized at a predetermined orientation relative to a wearer's eye and further stabilized at a predetermined orientation relative to a wearer's eyelid.

17. An electro-active contact lens system that includes a contact lens, an electro-active element, and a view detector stabilized at a predetermined orientation relative to a wearer's eye and further stabilized at a predetermined orientation relative to a wearer's pupil.

18. An electro-active contact lens system that includes a contact lens, an electro-active element, and a view detector stabilized at a predetermined orientation relative to a wearer's eye and wherein the view detector comprises a radar range finder.

19. An electro-active contact lens system that includes a contact lens, an electro-active element, and a view detector stabilized at a predetermined orientation relative to a wearer's eye and wherein the view detector comprises a laser range finder.

20. An electro-active contact lens system that includes a contact lens, an electro-active element, and a view detector, wherein the view detector is stabilized at a predetermined orientation relative to a horizontal meridian of of the contact lens system.

21. The electro-active contact lens system of claim 20 wherein the view detector is stabilized within plus or minus 5 degrees of the horizontal meridian of the contact lens system.

* * * * *